United States Patent [19]

Rajasekharan et al.

[11] Patent Number: 5,168,537
[45] Date of Patent: Dec. 1, 1992

[54] METHOD AND APPARATUS FOR COUPLING LIGHT BETWEEN AN OPTOELECTRONIC DEVICE AND A WAVEGUIDE

[75] Inventors: K. Rajasekharan, Lowell; James O. Pazaris, Concord, both of Mass.; Timothy L. Michalka, Salem, N.H.

[73] Assignee: Digital Equipment Corporation, Maynard, Mass.

[21] Appl. No.: 723,319

[22] Filed: Jun. 28, 1991

[51] Int. Cl.[5] .............................................. G02B 6/42
[52] U.S. Cl. ........................................ 385/89; 385/94
[58] Field of Search ....................... 385/88, 89, 90, 91, 385/92, 93, 94

[56] References Cited

U.S. PATENT DOCUMENTS

| | | | |
|---|---|---|---|
| 4,708,429 | 11/1987 | Clark et al. | 385/94 X |
| 4,744,626 | 5/1988 | Mery | 385/94 X |
| 4,752,109 | 6/1988 | Gordon et al. | 385/94 X |
| 4,840,451 | 6/1989 | Sampson et al. | 385/89 |
| 5,050,953 | 9/1991 | Anderson et al. | 385/89 |

*Primary Examiner*—John D. Lee
*Assistant Examiner*—Phan T. Heartney
*Attorney, Agent, or Firm*—Arnold, White & Durkee

[57] ABSTRACT

A system is disclosed for optically coupling one or more electrical signals to one or more optical waveguide members. A terminating block has embedded therein a first plurality of collimating cylindrical lenses protruding from a first end of the block. A plurality of fibers, arranged longitudinally with respect to the lenses, are additionally embedded in the block and exit the block through a second end. Outside of the block, the fibers are surrounded by a protector. A redirecting assembly defines a port, sized to receive the terminating block. Also defined within the assembly is a transverse aperture having a plurality of circularly enlarged regions. The assembly has a prism secured therein. The prism is positioned so that it is aligned with the first plurality of lenses when the block is fully inserted into the port. An integrated circuit package contains a plurality of light-emitting or light-detecting devices having one or more leads. The light-emitting or light-detecting devices are positioned within substantially cylindrical holes defined in a base of the integrated circuit package. Connected to each device is a collimating cylindrical lens that protrudes into the assembly and is aligned with the prism when the assembly is affixed to the base of the integrated circuit package.

24 Claims, 4 Drawing Sheets

METHOD AND APPARATUS FOR COUPLING LIGHT BETWEEN AN OPTOELECTRONIC DEVICE AND A WAVEGUIDE

BACKGROUND OF INVENTION

1. Field of Invention

This invention relates generally to optical coupling devices. More specifically, the invention concerns an improved method and apparatus for coupling one or more electrical signals between an optoelectronic device and one or more optical waveguide members.

2. Description of Related Art

One of the most important considerations in designing an electronic system is the connection between circuit components such as integrated circuits or optoelectronic devices. Sometimes, connections are needed between a first component mounted upon a printed circuit board and a second component located on the same board. Occasionally, connection is desired between a component mounted upon a printed circuit board and a connector located at the edge of the same board.

Traditionally, such connections have been accomplished by utilizing electrically conductive wiring. Such wiring is usually made from a metallic substance, and is often satisfactory for its intended purposes. However, there are often a number of disadvantages associated with the use of conventional metallic wiring. For example, metallic wiring is known to produce parasitic capacitance and inductance which can adversely affect a circuit's operation. In addition, metallic wiring produces electromagnetic noise which can interfere with the intended operation of a circuit. Furthermore, if metallic wiring is used more input/output lines might be required than might be desired due to the bandwidth limitations of metallic wiring.

One approach which has been used to overcome some of the disadvantages of conventional wiring is the use of light transmissive materials such as fiber optics. Fiber optics provide a number of advantages such as a high signal bandwidth and a low level of radiated noise.

However, there are still a number of limitations associated with the use of light transmissive materials in conjunction with electronic circuitry. In particular, the presently available technology for interconnecting circuit elements is not entirely satisfactory in a number of applications.

One type of connector that is presently utilized to connect optoelectronic devices to fiber optic media is called the "pigtail" connector. In one embodiment of the pigtail connector, an integrated circuit configured in a dual in-line package is contained within a housing, and mounted to a printed circuit board. Below the integrated circuit, and within the housing are contained light-producing or light-detecting elements coupled to leads of the integrated circuit. The light-producing element, for example, can be a semiconductor laser. These elements are typically attached to a collimator such as a collimating fiber, which resides within the housing. The collimating fiber extends to the edge of the housing, where the collimator is adjoined to an external fiber optic line that carries signals to and/or from the integrated circuit.

Although useful in many applications, pigtail connectors have a number of disadvantages when used in other applications. For example, pigtail connectors are sometimes difficult to repair since they are intended to permanently connect an optoelectronic device to a particular fiber. In addition, the fiber can not be readily disconnected from the housing. Thus, the integrated circuit can not be easily connected to a different fiber. Likewise, the fiber cannot be replaced without difficulty.

Furthermore the capability of pigtail connectors is limited to interfacing an integrated circuit with a small number of fiber optic lines. In fact, a single pigtail connector is only capable of connecting to a single fiber optic line.

Another approach that has been used to connect optoelectronic devices to fiber optic media has been the integration of light transmissive material into various layers of printed circuit boards. An example of this technology is found in U.S. Pat. No. 4,732,446 to Gipson et al. entitled "Electrical Circuit and Optical Data Buss."

Gipson et al. use a printed circuit board having embedded therein an optical data buss comprised of optical fibers. Holes are provided in the printed circuit board at predetermined locations to receive chip carriers. The chip carriers have transparent regions for interfacing with the optical fibers. The chip carriers also have means for receiving electrical signals from electrically conductive tracks embedded in the printed circuit board. Gipson et al. utilize an external connector to supply electrical power, electrical data input, and optical data to the printed circuit board.

Although the integration of fiber optic busses into printed circuit boards has been satisfactory for some purposes, there are a number of disadvantages to this approach in some applications. For example, if the fibers are somehow damaged, they are not easily repaired since they are permanently integrated into the printed circuit board. Furthermore, due to the permanent positioning of the data busses, the Gipson et al. system may not be as versatile as desired since the data busses can not be easily re-routed to achieve diverse interconnections. In addition, two circuits within the same printed circuit board are not easily interconnected with the Gipson et al. approach.

Another approach used to connect optoelectronic devices to fiber optic media is called "lateral coupling". One form of lateral coupling is described in "An Effective Lateral Fiber-Optic Electronic Coupling and Packaging Technique Suitable for VHSIC Applications", by Hartman et al., in the Journal of Lightwave Technology, Vol. LT-4 No. 1, Jan. 1986.

Hartman et al. describe a packaged fiber pigtail. In the Hartman et al. package, a coupler fiber with a 45° polished and mirrored Aluminum surface is installed within an optical receiver integrated circuit package assembly. The integrated circuit is mounted on a pedestal spacer within a rectangular metal flatpack, and the coupler fiber is attached to the integrated circuit with an ultraviolet curing epoxy.

A similar approach is discussed in the IBM Corp. publication "Optical Fiber Coupling Approaches for Multi-Channel Laser and Detector Arrays" by Jackson et al. The Jackson et al. article involves a fiber optic coupling approach for aligning four multi-mode fibers with a four-channel GaAs laser and detector array. The fibers are placed horizontally to the GaAs chip and the ends of the fibers are beveled at an angle of 35° to reflect light downward onto the photodetectors. Alternatively, the beveled surface is metalized and the bevel angle is 45°. Solder or epoxy is used to bond the fibers into grooves formed in a silicon substrate.

An approach like that of Hartman et al. and Jackson et al. is shown in Bellcore publication "Board Level High Speed Photonic Interconnections: Recent System Developments", by Lalk et al. Lalk et al. utilize an optical link to couple from a small area photodetector to a large rectangular waveguide made from ultraviolet-curable adhesives. The waveguide functions analogously to an optical fiber and the coupling is achieved through the use of a tapered fiber beveled at 35°.

In addition, Lalk et al. describe optical coupling between a laser diode and a waveguide utilizing a lensed fiber that is mounted in a hole drilled in the package wall. The fiber lens is utilized to collimate the light when it exits the package.

Although the connections disclosed by Hartman et al., Lalk et al., and Jackson et al. are useful for some purposes, these arrangements have several limitations. Specifically, these couplers involve permanent connections between a particular circuit and one or more fibers. Thus, the interconnections between circuit components cannot be varied to achieve diverse results.

Another limitation of these systems is that a substantial amount of time is required to achieve the desired connection. As discussed hereinabove, these couplers involve the use of epoxy or solder to attach the fiber to a substrate. Furthermore, the beveled surface of the fiber must be accurately aligned with the emitter or detector in order to achieve a connection with minimal losses.

Thus, the approaches of Hartman et al., Lalk et al., and Jackson et al. have certain disadvantages. In contrast to these approaches, various modular connectors have been used. A typical modular connector includes a light-producing or light-emitting device having two attachments. The first attachment can be connected to a circuit element such as an integrated circuit. The second attachment can be mated with a fiber optic line having a fixture that corresponds to the second attachment. Thus, the modular connector can be utilized as an interface between a circuit such as an integrated circuit and a fiber optic line.

As an example, Honeywell Corp. produces a number of modular connectors. Fixtures such as those described hereinabove are manufactured by corporations such as AT&T and GTE, and include numerous arrangements such as "FC", "BICONIC", "SMA", "ST", "D4", and "FC-PC", wherein ST is a registered trademark of AT&T Technologies.

Although useful for some purposes, these connector packages are not entirely satisfactory. In particular, the modular connectors are typically large, although compactness is often a primary consideration in the design of a printed circuit board.

Another limitation of the modular connectors is that each connector is only capable of attaching to a single fiber. Thus, one modular connector is required for each integrated circuit lead to be interfaced with a fiber optic line. As a result, modular connectors cannot conveniently be utilized in conjunction with fiber optic transmission lines having a plurality of fibers, such as fiber "ribbons".

Modular connectors are also limited in that they may not be easily connected to integrated circuits having a large number of leads such as pin grid arrays. Due to the size of the modular connectors, and the requirement for a separate modular connector for each lead to be accessed, circuits such as pin grid arrays cannot be feasibly interfaced with a plurality of fiber optic lines using modular connections.

BRIEF SUMMARY OF INVENTION

The present invention is addressed at the above-mentioned problems.

In accordance with one aspect of the present invention, an apparatus is provided for interfacing one or more electrical signals of a circuit component to one or more optical signals present on one or more optical fibers or other waveguide members. The apparatus includes one or more optoelectronic elements, a first housing having a port defined therein, a light redirecting means having a first edge in predetermined alignment with respect to the optoelectronic elements, a second housing sized to be removably secured within the port, and one or more waveguide members having ends contained within the second housing wherein the waveguide ends are in a predetermined alignment with respect to the light redirecting means when the second housing is removably secured within the port.

Pursuant to another aspect of the invention, an apparatus for coupling one or more optical signals from a waveguide to an optoelectronic element is provided. The apparatus includes a first housing having a port defined therein, a light redirecting means having a first edge in predetermined alignment with respect to one or more optoelectronic elements, a second housing sized to be removably secured within the port, and one or more waveguides having ends contained within the second housing wherein the waveguide ends are in a predetermined alignment with respect to the light redirecting means when the second housing is secured within the port.

According to still another aspect of the invention, a method is provided for coupling light signals from one or more waveguide members to an optoelectronic device. The method includes the steps of firmly inserting an inner housing member into an outer housing member, receiving one or more first optical signals from one or more waveguide members contained in the inner housing member, redirecting the first optical signals to produce one or more second optical signals, and directing the second optical signals to one or more optoelectronic devices.

DESCRIPTION OF DRAWINGS

With these and other Objects in View, as will hereinafter more fully appear, and which will be more particularly pointed out in the appended claims, reference is now made to the following description taken in connection with the accompanying drawings in which:

DESCRIPTION OF PREFERRED EMBODIMENT

Figure 1:
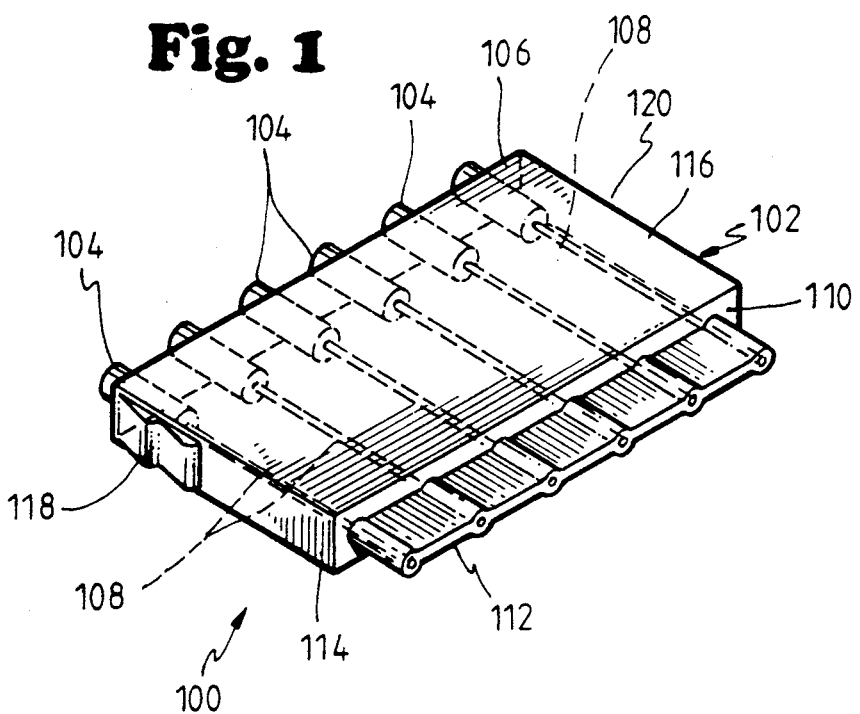
FIG. 1 is an isometric view of a terminating block of the present invention.

Referring now to the drawings, a preferred embodiment of the invention will be described. The present invention generally provides an improved system and method for coupling one or more electrical signals from an integrated circuit to one or more optical waveguide members.

Figure 2:
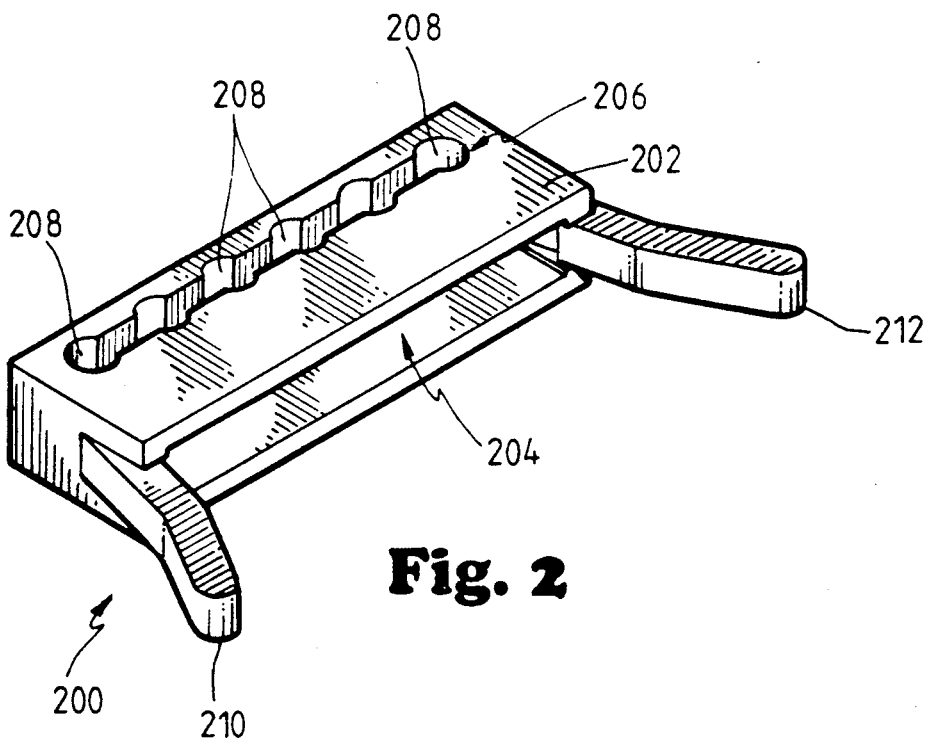
FIG. 2 is an isometric view of a redirecting assembly of the present invention.
Figure 3:
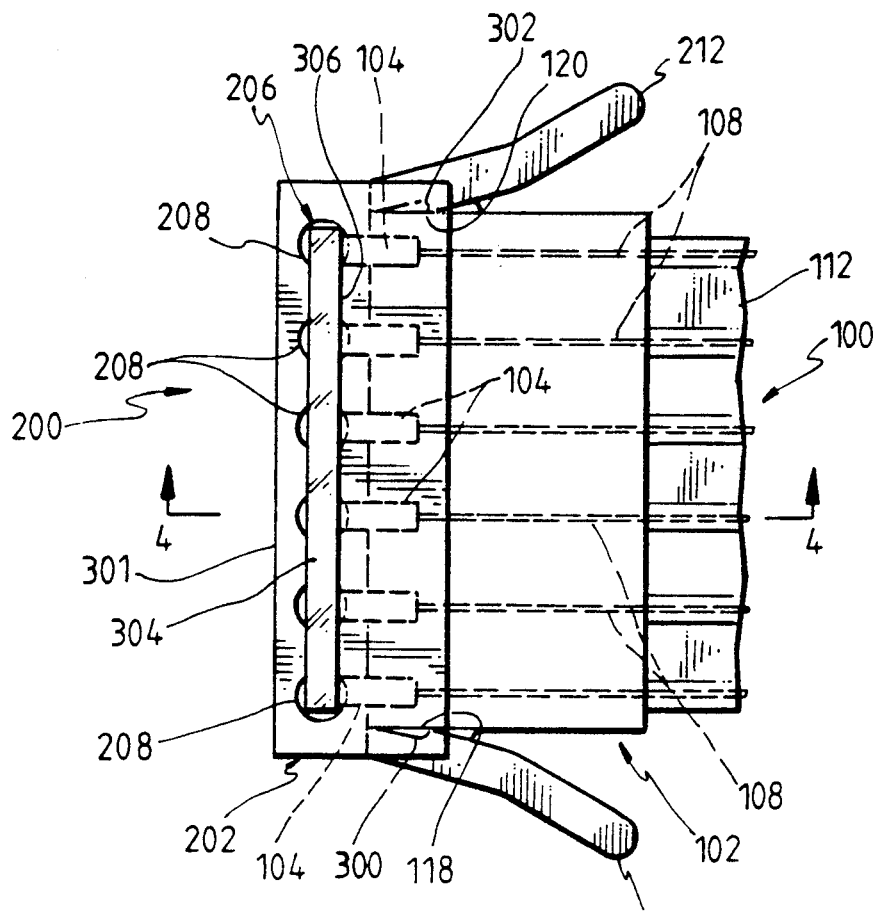
FIG. 3 is a top view of the terminating block fully inserted into the redirecting assembly of the present invention.
Figure 4:
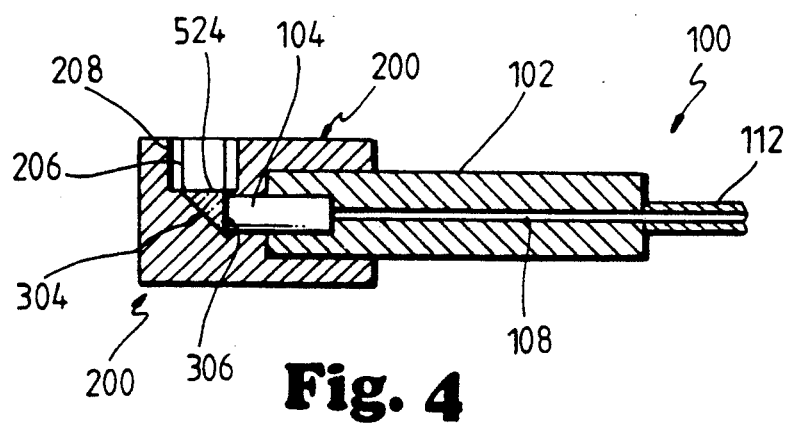
FIG. 4 is a cross-sectional side view of the terminating block coupled into the redirecting assembly of the present invention, taken at a line 301, with the arms and catches removed.
Figure 5:
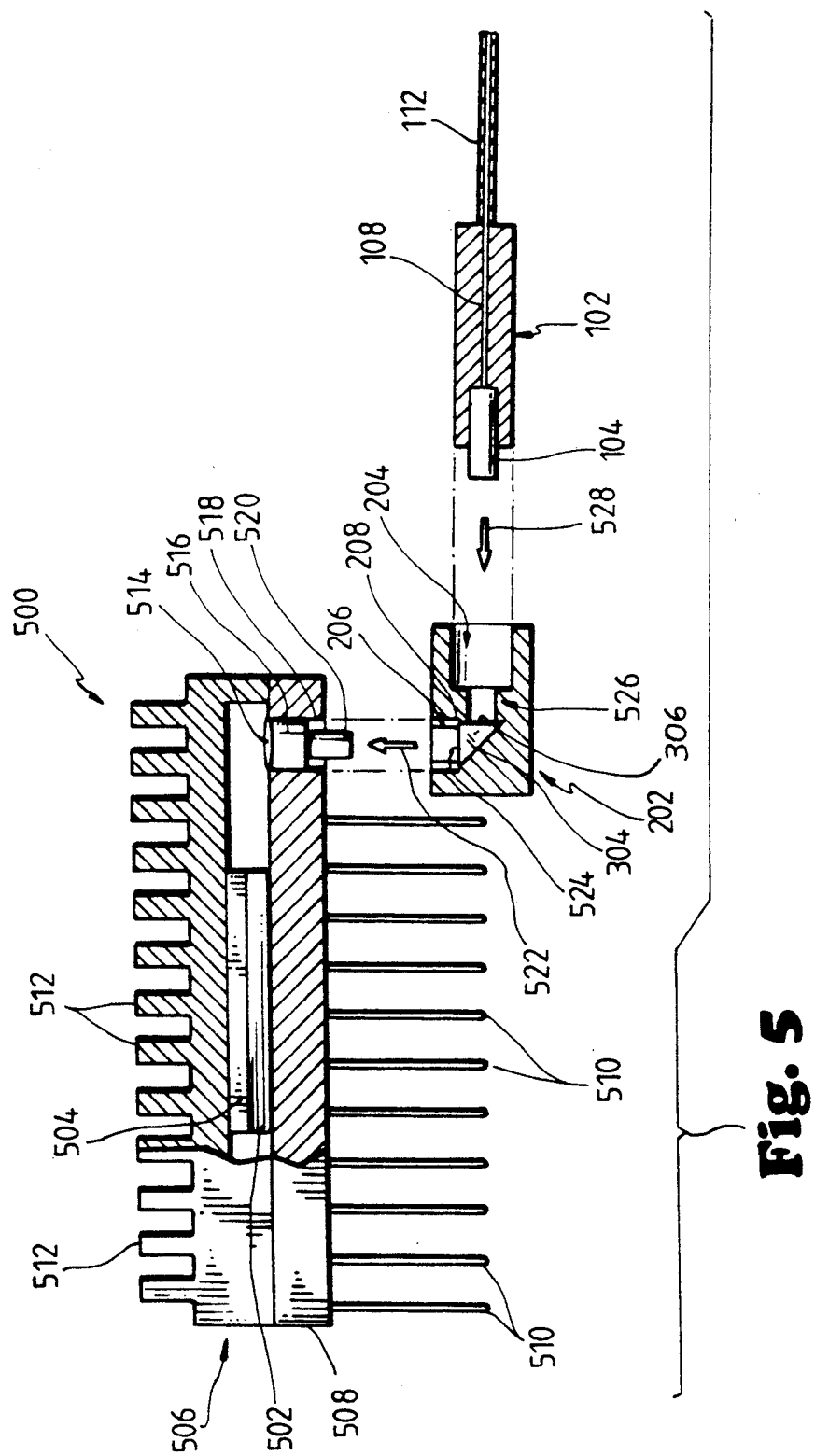
FIG. 5 is a cross-sectional, exploded side view of the terminating block and redirecting assembly of the present invention in relation to an integrated circuit package.
Figure 6:
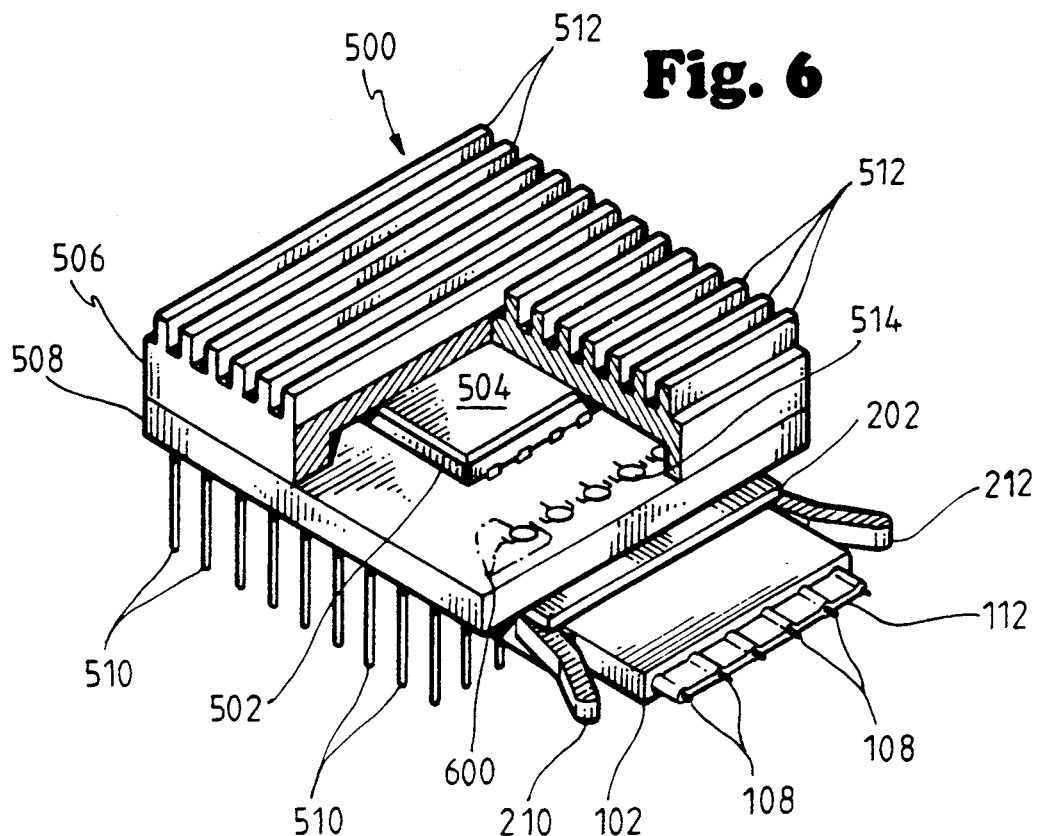
FIG. 6 is an isometric view of the terminating block, the redirecting assembly, and the optoelectronic package of the present invention, wherein the terminating block is fully inserted into the redirecting assembly, and the redirecting assembly is fastened to the integrated circuit package.
Figure 7:
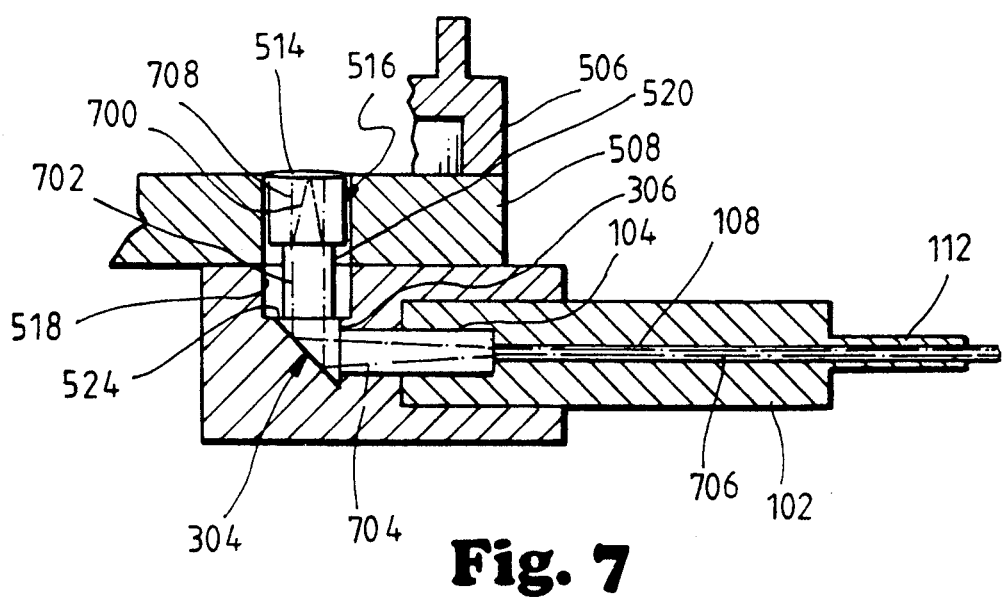
FIG. 7 a cross-sectional side view of the terminating block coupled to the redirecting assembly of the present invention, taken at line 301 of FIG. 3, with the arms and catches removed, showing the path of a light beam in accordance with the present invention.

The invention includes a number of principal components, including a terminating block 100 most clearly shown in FIG. 1, 3, and 4; a redirecting assembly 200 most clearly shown in FIGS. 2-4; and an integrated circuit package 500 most clearly shown in FIGS. 5-7.

The structure and interconnections of the components of the invention will now be described, beginning with the terminating block 100 of FIG. 1. The block 100 includes a housing 102 having embedded therein a first plurality of collimating cylindrical lenses 104. The lenses 104 protrude from the housing 102 through a first end 106. Additionally embedded within the housing 102 are a plurality of fibers 108. The fibers 108 are positioned in longitudinal alignment with the lenses 104. The fibers 108 may be arranged to abut the lenses 104. Alternatively, the fibers 108 may be positioned so that an interstitial space (not shown) such as 10 microns is provided between the fibers 108 and the lenses 104.

The fibers 108 exit the housing 102 through a second end 110 of the housing 102. Outside of the housing 102, the fibers 108 are surrounded by an protector 112, that may be configured in the shape of a ribbon. The protector 112 may be attached to the end 110 in order to provide strain relief against tension upon the fibers 108. Additionally, the housing 102 includes sides 114 and 116, having catches 118 and 120, respectively, protruding therefrom.

Referring now to FIG. 2, the redirecting assembly 200 includes a housing 202 defining a port 204 sized to receive the housing 102 of the terminating block 100. Also defined within the housing 102 is a transverse aperture 206 having a plurality of circularly enlarged regions 208. Extending from the housing 202 are locking arms 210 and 212.

FIG. 3 is a top view of the terminating block 100 fully inserted into the redirecting assembly 200 of the present invention. FIG. 4 is a cross-sectional side view taken at a line 301 of the terminating block 100 coupled into the redirecting assembly of the present invention. In FIG. 4, the arms 210/212 and catches 118/120 are not shown for purposes of clarity.

The arms 210 and 212 of the housing 202 have defined therein notches 300 and 302, adapted to engage the catches 118 and 120 of the housing 102 upon the full insertion of the housing 102 into the port 204.

Furthermore, the housing 202 has a prism 304 secured therein. The prism 304 has a first edge (or face) 306. When the housing 102 is fully inserted into the port 204, the lenses 104 reside within holes 526 (shown in FIG. 5) defined in the housing 202 and the first edge 306 is aligned perpendicularly to the lenses 104. Moreover, the lenses 104 may be of such lengths that the lenses 104 abut the edge 306 when the housing 102 is fully inserted into the port 204. Preferably, the lenses 104 are of such lengths that an interstitial space (not shown) is provided between the lenses 104 and the edge 306 when the housing 102 is fully inserted into the port 204.

FIGS. 5 and 6 show the terminating block 100 and the redirecting assembly 200 in conjunction with an integrated circuit package 500, in accordance with the present invention. FIG. 5 is a cross-sectional, exploded side view of the block 100, assembly 200, and package 500. In FIG. 5, the arms 210/212 and catches 118/120 are not shown for purposes of clarity. It is to be understood that the present invention is described in conjunction with an integrated circuit for illustrative purposes only. The invention can be used with a variety of circuit components having one or more optoelectronic devices associated therewith.

FIG. 6 is an isometric view of the terminating block 100, the redirecting assembly 200, and the integrated circuit package 500 of the present invention, wherein the block 100 is fully inserted into the assembly 200, and the assembly 200 is fastened to the package 500.

The package 500 as shown in FIG. 5 comprises a circuit package such as a pin grid array. Alternatively, the package 500 is contemplated to be a circuit package such as a pad grid array. The package 500 includes an integrated circuit 502 such as a VLSI chip; a pad 504; a heat sink 506; a base 508; and a plurality of interface pins 510. The pad 504 provides a means for pressing the circuit 502 against the base 508, and is constructed of a medium capable of efficient heat transfer. Alternatively, the pad 504 could be embodied by an air gap (not shown) used to transfer heat. The heat sink primarily comprises a plurality of fins 512, intended to effectively transfer heat from the package 500.

The package 500 further includes a plurality of light-emitting or light-detecting devices 514, such as phototransistors, photodiodes, or other components capable of interfacing between a light beam and an electrical signal. One such device is shown in a cutaway portion of the package 500. The devices 514 each have one or more leads 600, each of the leads 600 being electrically attached to a selected node (not shown) of the circuit 502. If it is desired to transmit an electrical signal from a particular node of the circuit 502 through one of the fibers 108, then a light-producing device such as a light-emitting diode, semiconductor laser, or the like is provided for that node.

However, if it is desired to receive an electrical signal from one of the fibers 108 at a particular node of the circuit 502, then a light-detecting device 514 such as a phototransistor is provided for that node. Thus, the devices 514 comprise a variety of light-producing or light-detecting elements which are selected in accordance with the specific requirements of the particular application in which the invention is utilized.

As is commonly known by those of ordinary skill in the art of electro-optics, each of the devices 514 and each of the leads 600 associated with a particular device 514 may be connected to a package such as a "TO"can 516. The cans 516 are positioned within substantially cylindrical holes 518 defined in the base 508.

Additionally, each can 516 has a collimating cylindrical lens 520 connected thereto. The lenses 520 each comprise a lens such as a graded index, or GRIN lens, or another cylindrical lens having an index of refraction that varies according to the radial dimension of the lens. The lenses 520 are chosen depending upon the wavelength of light produced by the devices 514.

The housing 202 is attached to the base 508 by moving the housing 202 in the direction of arrow 522 shown in FIG. 5. Thus, the collimating lenses 520 protrude into the regions 208 and are longitudinally aligned with a second edge 524 of the prism 304. The lenses 520 may be arranged so as to abut the second edge 524 of the prism 304 when the housing 202 is affixed to the base 508. Preferably, the lenses 520 are constructed so that an interstitial space (not shown) such as 10 microns is provided between the lenses 520 and the second edge 524.

Having described the structure and interconnection of the various components of the present invention, the operation of the invention will be discussed with reference to FIGS. 1-6.

To permit light to pass between the fibers 108 and the devices 514, the block 100 is inserted into the assembly 200 in the direction shown by arrow 528 in FIG. 5. This is accomplished by slidably inserting the housing 102 into the port 204. When the housing 102 has sufficiently entered the port 204, the arms 210/212 prevent the removal of the housing 102, thereby connecting the housing 102 to the housing 202. Specifically, the notches 300/302 defined in the arms 210/212 engage the catches 118/120 formed upon the housing 102.

The block 100 can be removed from the assembly 200 by applying simultaneous outward pressure upon the arms 210/212, while slidably withdrawing the housing 102 from the port 204.

The present invention is not limited to the connecting device embodied by the arms 210/212, the notches 300/302, and the catches 118/120. Without departing from the scope of the present invention, use could be made of hooks, snaps, or other suitable arrangements to selectively fasten the housing 102 to the housing 202.

In order to further describe the operation of the invention, FIG. 7 will now be described. FIG. 7 is a cross-sectional side view taken at line 306, of the terminating block coupled into the redirecting assembly of the present invention, with the arms 210/212 and catches 118/120 removed, showing the path of a light beam in accordance with the present invention.

Referring to FIG. 7 in conjunction with FIGS. 1-6, when the leads 600 of the device 514 receive a predetermined electrical signal from the circuit 502, the device 514 produces a light beam 700 which diverges. The light diverging beam 700 is received by the lens 520, wherein the collimating characteristics of the lens 520 produce a cylindrical beam 702.

Subsequently, the cylindrical beam 702 is reflected by the prism 304, and received by the collimating cylindrical lens 104. After receiving the cylindrical beam 702, the lens 104 produces a converging beam 704 in accordance with its collimating properties. The converging beam 704 is then received by the fiber 108 and transmitted in a substantially cylindrical path 706.

Still referring to FIG. 7, Wherein the device 514 is a light-detecting element, the substantially cylindrical beam 706 is received by the lens 104 from the fiber 108. The lens 104 produces a diverging light beam 704, in accordance with the collimating characteristics of the lens 104.

Subsequently, the beam 104 is reflected by the prism 304 and received by the lens 520. The lens 520 produces a substantially cylindrical beam 702 pursuant to its collimating properties. The beam 702 continues in a cylindrical form, as a beam 708, and is thereafter received by the light-detecting device 514.

Alternatively, if a converging lens (not shown) is provided within the can 516, a beam 700 is produced. The beam 700 thus converges, or is focused, upon the device 514.

The present invention may be used in a number of applications. For example, signals may be coupled directly between two separate integrated circuit packages equipped with the invention.

In addition, the invention may be used to couple an integrated circuit package to a separate connector affixed at an edge of a printed circuit board. Such an edge-located connector may be used to carry the signals to a separate integrated circuit package that is equipped with the invention and is located on a separate printed circuit board. Alternatively, the edge-located connector may be used to couple the signals to a fiber optic telecommunication line.

It is to be understood that the present invention is not limited to fiber optic media. Alternatively, the invention can be constructed utilizing a polymer waveguide such as PMMA. Furthermore, the invention can include waveguides that are integrated within a printed circuit board.

The present invention provides a number of advantages to its users. In particular, the invention overcomes several limitations of metallic connective devices since the invention utilizes an optical transmission medium.

Another advantage of the present invention is that it facilitates expedient, automatic alignment between a fiber optic element and a light-emitting or light-detecting device.

A further benefit of the invention is that it provides coupling that may be repetitively connected and disconnected. Thus, the invention facilitates re-routing of fiber optic lines between circuit elements, thereby enabling diverse circuit interconnections.

Another advantage of the invention is that it may be used to couple an integrated circuit to an edge connector or alternatively, another circuit located on the same board. Thus, the invention enables connection among multiple integrated circuits on the same printed circuit board as well as circuits located on separate printed circuit boards.

The invention is also beneficial in that it provides coupling from fiber optical cables having a plurality of fibers to electrical circuits having a plurality of leads, such as pin grid arrays or pad grid arrays.

In addition, the invention provides versatility. On one hand, the connector, the fiber, and the integrated circuit may be located on the surface of a printed circuit board if desired. Alternatively, the fiber may be embedded in the printed circuit board.

A further benefit of the present invention is that it is easier to manufacture than the optical couplers of previous arrangements.

While there have been shown what are presently considered to be preferred embodiments of the invention, it will be apparent to those skilled in the art that various changes and modifications can be made herein without departing from the scope of the invention as defined by the appended claims.

What is claimed is:

1. An apparatus for interfacing a plurality of optoelectronic elements to a corresponding number of elongated optical waveguide members, comprising:

(a) a first housing having first and second faces oriented at an angle with respect to each other, the first face having defined therein a port and the second face having defined therein a transverse aperture;

(b) a second housing with outside dimensions slightly smaller than the port permitting the second housing to be slidably inserted into and removed from the first housing within the port, said second housing containing one end of each elongated optical waveguide member;

(c) a locking member for selectively locking the second housing to the first housing when the second housing is inserted into the first housing; and (d) light redirecting means integral with one of said housings to redirect light between the ends of the waveguide members and the optoelectronic elements through the transverse aperture.

2. The apparatus of claim 1, further comprising a plurality of first collimating lenses corresponding in number to the number of waveguide members, wherein each first collimating lens is located between a different optoelectronic element and the light redirecting means.

3. The apparatus of claim 1, further comprising a plurality of second collimating lenses corresponding in number to the number of waveguide members, wherein each second collimating lens is located in the second housing between the light redirecting means and a different waveguide member when the two housings are secured to one another.

4. The apparatus of claim 1, further comprising a plurality of second collimating lenses corresponding in number to the number of waveguide members, wherein each second collimating lens is located in the first housing between the light redirecting means and a different waveguide member when the two housings are secured to one another.

5. The apparatus of claim 1, wherein the light redirecting means comprises a device having a light-reflective surface.

6. The apparatus of claim 1, which further comprises an integrated circuit package.

7. The apparatus of claim 6, wherein the first housing is attached to the integrated circuit package.

8. The apparatus of claim 1, wherein the light redirecting means is attached to the first housing.

9. The apparatus of claim 1, wherein the locking member comprises:

one or more arms attached to the first housing, said arms having notches defined therein; and one or more catches formed on the second housing, said catches being positioned to removably lock the second housing to the first housing when the second housing is inserted a predetermined distance into the port.

10. The apparatus of claim 1, wherein the optoelectronic device is a light-emitting element.

11. The apparatus of claim 1, wherein the optoelectronic device is a light-detecting element.

12. The apparatus of claim 1, wherein the waveguide members comprise optical fibers.

13. An apparatus for coupling optical signals from a plurality of elongated waveguide members to a corresponding number of optoelectronic elements, comprising:

a first housing having first and second faces oriented at an angle with respect to each other, the first face having defined therein a port and the second face having defined therein a transverse aperture;

a second housing with outside dimensions slightly smaller than the port such that the second housing can be slidably inserted into the port;

a locking member for selectively locking the second housing to the first housing when the second housing is inserted into the first housing; and means for redirecting light, integral with one of said housings, said means for redirecting light being in optical alignment with respect to the optoelectronic elements and the transverse aperture when the two housings are secured to one another; and a plurality of waveguide members, each waveguide member having one end secured in the second housing, said ends being aligned with the light redirecting means when the two housings are secured to one another.

14. The apparatus of claim 13, further comprising a plurality of first collimating lenses corresponding in number to the number of waveguide members, wherein each first collimating lens is located between a different optoelectronic element and the means for redirecting light.

15. The apparatus of claim 13, further comprising a plurality of second collimating lenses corresponding in number to the number of waveguide members, wherein each second collimating lens is located in the second housing between the means for redirecting light and a different waveguide member when the two housings are secured to one another.

16. The apparatus of claim 13, further comprising a plurality of second collimating lenses corresponding in number to the number of waveguide members, wherein each second collimating lens is located in the first housing between the means for redirecting light and a different waveguide member when the two housings are secured to one another.

17. The apparatus of claim 13, wherein the means for redirecting light comprises a light-reflective surface.

18. The apparatus of claim 13, which further comprises an integrated circuit package.

19. The apparatus of claim 18, wherein the first housing is attached to the integrated circuit package.

20. The apparatus of claim 13, wherein the locking member comprises:

one or more arms attached to the first housing, said arms having notches defined therein; and one or more catches formed on the second housing, said catches being positioned to removably lock the second housing to the first housing when the second housing is inserted a predetermined distance into the port.

21. The apparatus of claim 13, wherein the optoelectronic device is a light-emitting element.

22. The apparatus of claim 13, wherein the optoelectronic device is a light-detecting element.

23. The apparatus of claim 13, wherein the waveguide members comprise optical fibers.

24. The apparatus of claim 13, wherein the light redirecting means is attached to the first housing.

* * * * *